(12) United States Patent
Scholz et al.

(10) Patent No.: US 10,710,814 B2
(45) Date of Patent: Jul. 14, 2020

(54) DEVICE FOR SHAPING A NARROW CONTAINER STREAM INTO A WIDE CONTAINER STREAM

(71) Applicant: KHS GmbH, Dortmund (DE)

(72) Inventors: Ulrich Scholz, Lüdinghausen (DE); Sebastian Götze, Dortmund (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/624,968

(22) PCT Filed: Jun. 5, 2018

(86) PCT No.: PCT/EP2018/064736
§ 371 (c)(1),
(2) Date: Dec. 20, 2019

(87) PCT Pub. No.: WO2019/001909
PCT Pub. Date: Jan. 3, 2019

(65) Prior Publication Data
US 2020/0172348 A1 Jun. 4, 2020

(30) Foreign Application Priority Data
Jun. 29, 2017 (DE) .................. 10 2017 114 460

(51) Int. Cl.
*B65G 47/71* (2006.01)
*B65G 21/20* (2006.01)

(52) U.S. Cl.
CPC ....... *B65G 47/715* (2013.01); *B65G 21/2072* (2013.01); *B65G 2201/0244* (2013.01); *B65G 2201/0252* (2013.01)

(58) Field of Classification Search
CPC ...... B65G 47/70; B65G 47/71; B65G 47/715; B65G 21/20; B65G 21/2054; B65G 21/2072; B65G 2201/0235; B65B 35/44
USPC .......................................... 198/836.3; 53/543
See application file for complete search history.

(56) References Cited

U.S. PATENT DOCUMENTS

| | | | | |
|---|---|---|---|---|
| 3,279,579 A | * | 10/1966 | Englander | B65G 47/715 |
| | | | | 198/442 |
| 3,552,537 A | * | 1/1971 | Vamvakas | B65G 47/715 |
| | | | | 198/442 |
| 4,308,944 A | * | 1/1982 | Probst | B65G 47/31 |
| | | | | 198/442 |
| 4,496,040 A | | 1/1985 | Kronseder et al. | |

(Continued)

FOREIGN PATENT DOCUMENTS

| DE | 4317069 | 1/1994 |
|---|---|---|
| DE | 10 2014 111 428 | 2/2016 |

(Continued)

*Primary Examiner* — Joseph A Dillon, Jr.
(74) *Attorney, Agent, or Firm* — Occhiuti & Rohlicek LLP

(57) ABSTRACT

An apparatus for shaping a narrow container stream, into a wide container stream includes container guides and a shaping region that extends between an inlet and an outlet. Transport bands connecting laterally to each other and define a transport plane along which the containers are transported. The container guides are constrained to be between defined limit curves defined by second and third order polynomials. As a result, the container guides are cambered in a way that promotes interruption-free widening of the container stream.

20 Claims, 3 Drawing Sheets

(56) References Cited

U.S. PATENT DOCUMENTS

| | | | | |
|---|---|---|---|---|
| 4,874,079 A * | 10/1989 | Frenkel | .................. | B65G 47/71 |
| | | | | 198/436 |
| 4,974,721 A * | 12/1990 | Born | .................... | B65G 47/715 |
| | | | | 198/434 |
| 5,711,137 A * | 1/1998 | Moncrief | ................ | B65B 35/54 |
| | | | | 53/534 |
| 6,206,174 B1 * | 3/2001 | Koltz | .................... | B65G 47/715 |
| | | | | 198/444 |
| 6,401,904 B1 * | 6/2002 | Risley | .................... | B07C 5/362 |
| | | | | 198/380 |
| 7,111,723 B2 * | 9/2006 | Petrovic | ............. | B65G 47/5104 |
| | | | | 198/347.1 |
| 7,926,242 B2 * | 4/2011 | Faissolle | ................ | B65H 31/00 |
| | | | | 53/55 |
| 7,942,255 B2 * | 5/2011 | Seger | .................. | B65G 47/682 |
| | | | | 198/442 |
| 8,196,733 B2 * | 6/2012 | Hahn | ..................... | B65G 47/71 |
| | | | | 198/347.4 |
| 2007/0144868 A1 * | 6/2007 | Zeitler | .................. | B65G 43/08 |
| | | | | 198/460.1 |
| 2012/0031050 A1 * | 2/2012 | Werner | .................. | B65B 35/40 |
| | | | | 53/448 |
| 2013/0056329 A1 * | 3/2013 | Grootherder | .......... | B65G 47/71 |
| | | | | 198/444 |
| 2017/0233196 A1 * | 8/2017 | Scholz | .................. | B65G 15/50 |
| | | | | 198/445 |
| 2018/0273309 A1 * | 9/2018 | Heitplatz | ........... | B65G 21/2054 |

FOREIGN PATENT DOCUMENTS

| | | |
|---|---|---|
| EP | 0626327 | 11/1994 |
| WO | WO 2016/023670 | 2/2016 |

\* cited by examiner

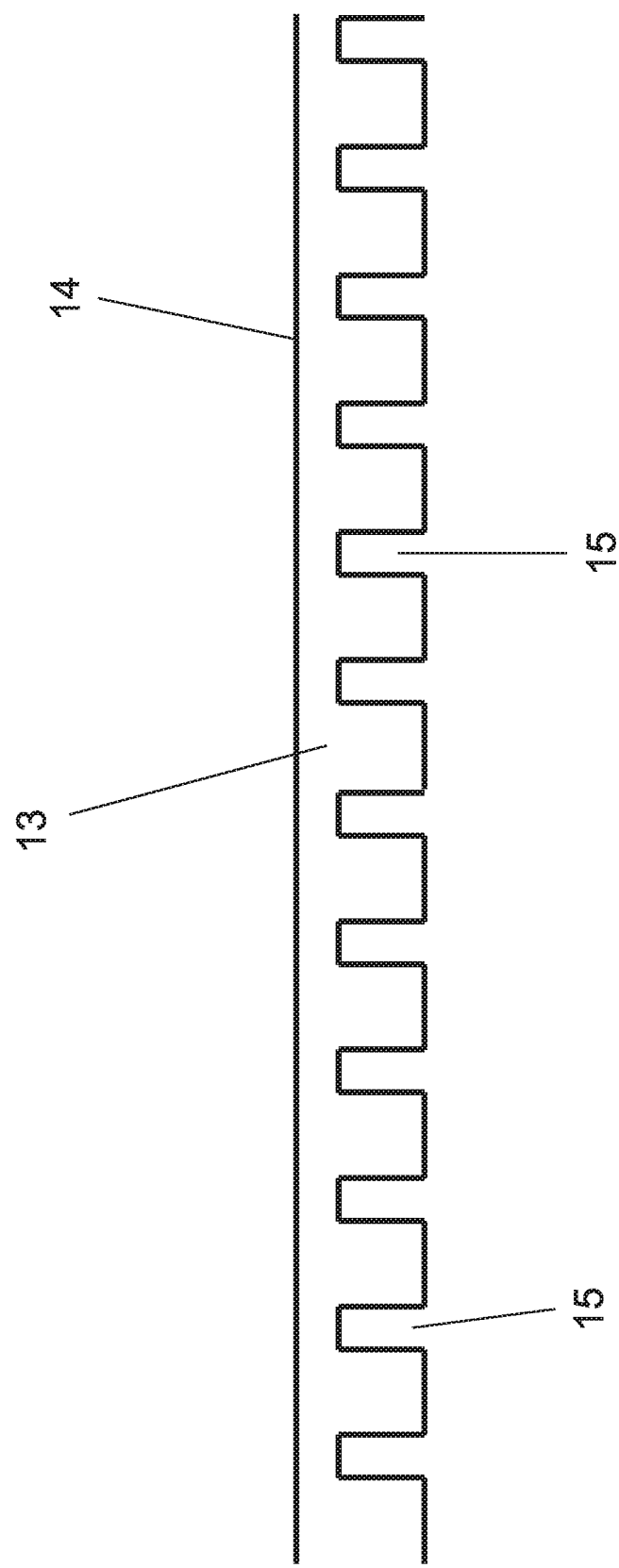

DEVICE FOR SHAPING A NARROW CONTAINER STREAM INTO A WIDE CONTAINER STREAM

RELATED APPLICATIONS

This is the national stage of international application PCT/EP2018/064736, filed on Jun. 5, 2018, which claims the benefit of the Jun. 29, 2017 priority date of German application DE 102017114460.9, the contents of which are incorporated herein by reference.

FIELD OF INVENTION

The invention relates to a device for shaping a narrow container stream into a wide container stream.

BACKGROUND

A container-handling machine outputs a stream of processed containers. For example, a filling machine or a closing machine will output one filled or closed container one after another. This stream is typically only one container wide.

For packaging applications, it is useful to have a stream whose width is a multiple of the container's width. This is because packaged containers often come as rectangular arrays of containers and not single lines of containers. As a result, there exist known devices that carry out the function of transforming a narrow container streams into wider container streams.

Known devices for carrying out the foregoing function require a relatively long conveying path for reliable and interruption-free widening of a container stream. In many cases, known devices achieve this only attained after two stations or shaping sectors that follow one another in sequence.

In addition, when devices are handling many containers at high speed, the containers may become unstable. This is particularly true for tall containers made of a lighter material, such as plastic or polyethylene terephthalate containers. This impedes operational reliability.

SUMMARY

An object of the invention is that of shaping a narrow container stream into a wide container stream along a transport path that is shorter than those used in the prior art.

The invention features an apparatus that shapes a narrow container stream into a wide container stream using a short transport path in a manner that avoids container instability and reduces noise. The illustrated apparatus works containers made of plastic or PET as well as containers made of glass. The length of the transport path, complete with its deceleration segment and its shaping segment, is only half that used in known devices. In particular embodiments, the transport length is as short as 1,500 millimeters.

The apparatus includes inner and outer container guides or guide rails that define a shaping region between two limit curves. Each container guide has an inner surface, which is the surface that contacts the containers. The inner guide's inner surface is cambered to be convex and the outer guide's inner surface is cambered to have a concave portion and a convex portion.

The containers are transported along a transport plane by parallel moving bands. The transport plane extends along a transport direction and a transverse direction. The transport direction is that along which the bands propel containers. The transverse direction is perpendicular to this transport direction.

The shaping region's container outlet is offset relative to its container inlet along this transverse direction. The speeds of the bands vary with their distance from the container inlet along the transverse direction. In particular, bands that are further from the container inlet along the direction of offset move more slowly.

A substructure or machine frame supports the bands, their bearing arrangements, their drives, and the container guides, or guide railings. The width of the frame arises as a result of having to accommodate the transport bands, the reduction gears, a carrier structure, the container guides, and a side wall.

The particular embodiment illustrated herein happens to have seven transport bands, each of which is about 85 millimeters wide. However, different numbers of transport bands can be used. Embodiments include those in which the transport bands include transport chains, those in which they hinged band chains, and those in which they mat chains.

These and other features and advantages of the invention will be apparent from the following detailed description and the accompanying figures, in which:

BRIEF DESCRIPTION OF THE DRAWINGS

The invention is described hereinafter in greater detail on the basis of the figures. These show:

FIG. 3 shows a portion of a guide profile for forming one or both of the container guides of the apparatus shown in FIG. 1.

Figure 1:
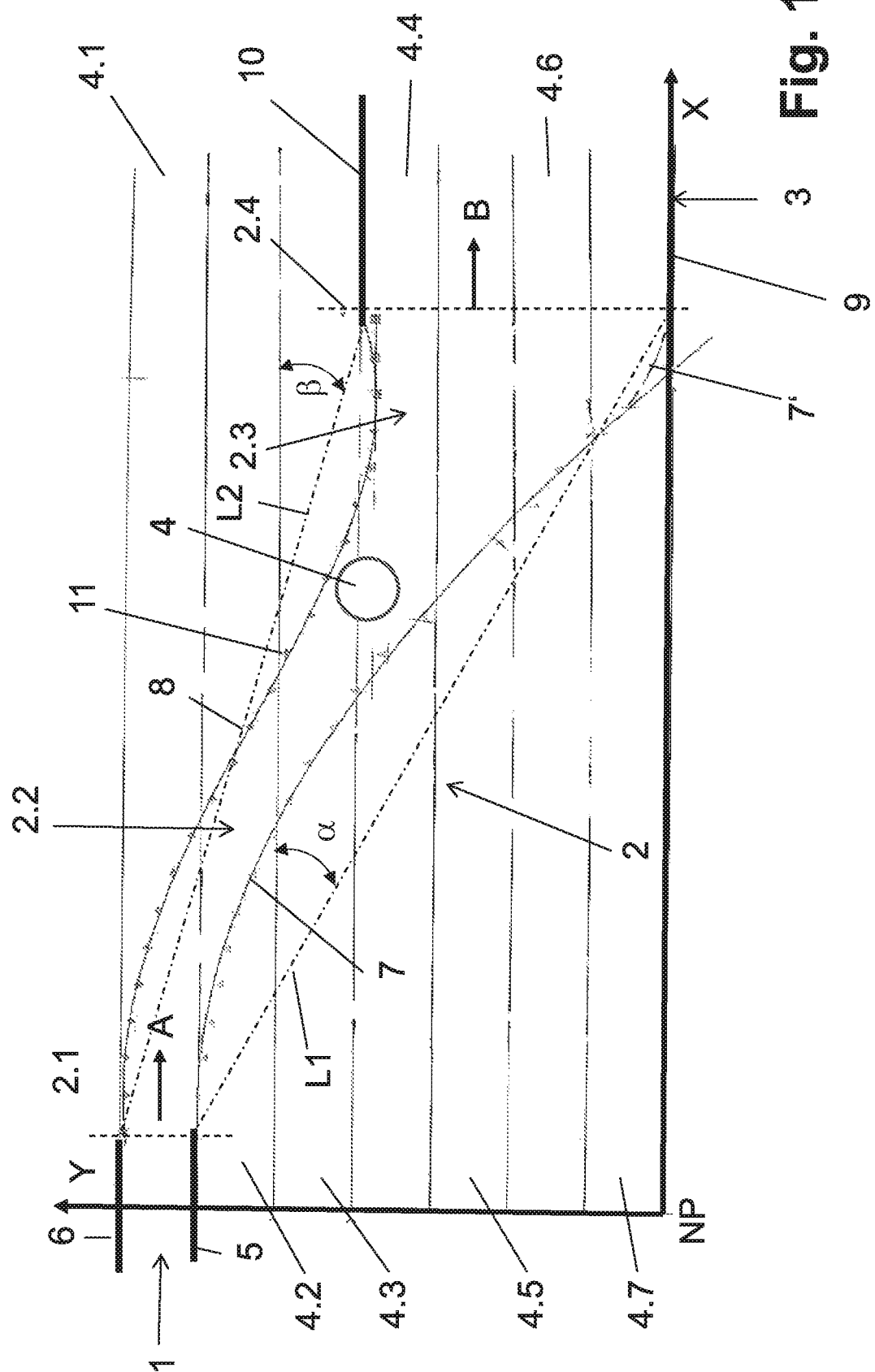
FIG. 1 shows a view from above an apparatus that shapes a single-lane container stream into a four-lane container stream.
Figure 2:
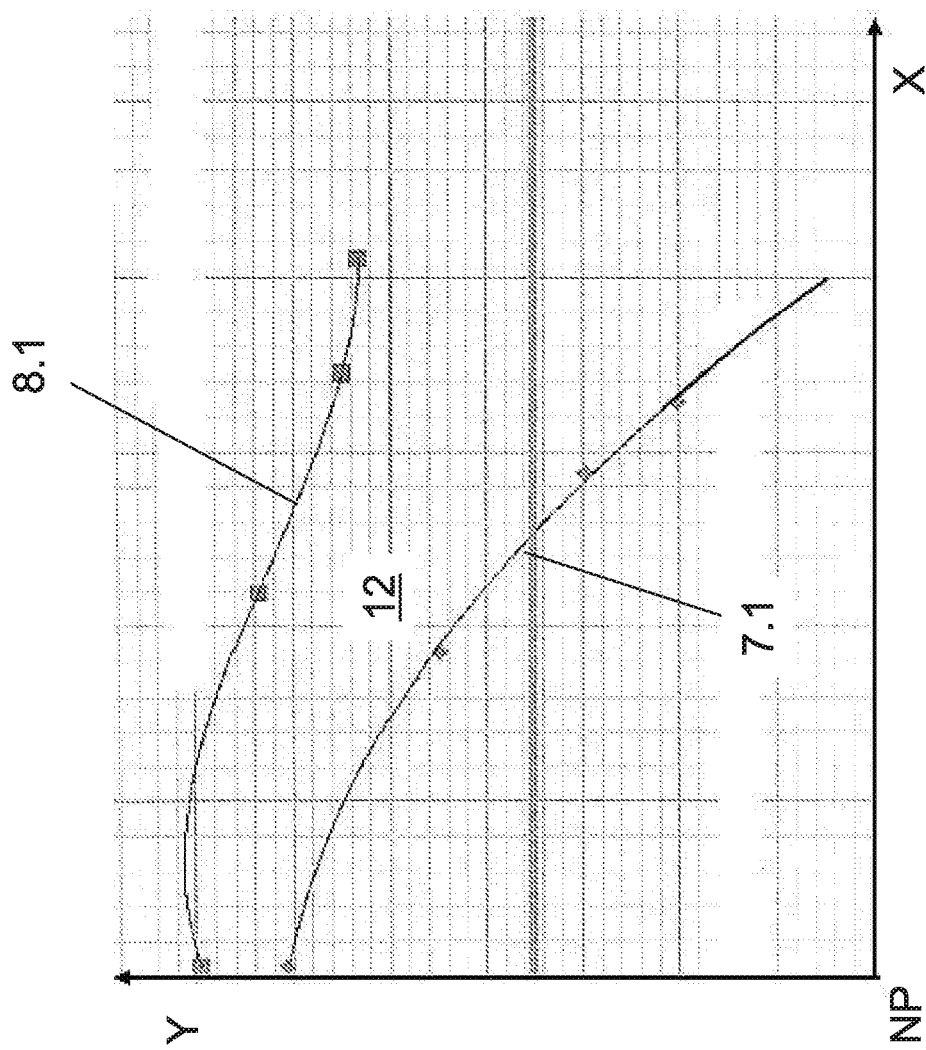
FIG. 2 shows limit curves for inner and container guides for the apparatus shown in FIG. 1.

For ease of exposition, a Cartesian coordinate system has been overlaid on FIGS. 1 and 2. The point NP is the coordinate origin. container.

DETAILED DESCRIPTION

FIG. 1 shows a device for shaping a single-lane container stream into a wide multi-lane container stream. For convenience in exposition, the illustrated device is shown against the backdrop of a coordinate system having an X-axis and a Y-axis that together define a horizontal transport plane along which containers 4 that stand on their bases are moved from a delivery conveyor 1, through a shaping region 2 connecting to the delivery conveyor 1 along a first transport direction A, and on to a discharge conveyor 3 that is offset from the delivery conveyor 1 along the Y-axis. The discharge conveyor 3 conveys a wide stream of containers 4 along a second transport direction B. This conveyor stream's width is a multiple of the diameter of a container's diameter.

At a point that connects to the delivery conveyor 1, the shaping region 2 forms a container inlet 2.1 that connects to a deceleration segment 2.2 on which the transport direction of the containers 4 changes. In normal operation, the deceleration segment 2.2 alters the containers' velocities in both magnitude and direction so as to reliably maintain the single-lane container stream until they reach a shaping segment 2.3.

As containers proceed in the transport direction along the deceleration segment 2.2, they encounter the shaping segment 2.3. It is here that wide container stream begins to form. The discharge conveyor 3 connects to a container outlet 2.4 of the shaping segment 2.3 and the shaping region 2 is the discharge conveyor 3.

Within the shaping region 2, first through seventh transport bands 4.1-4.7 form the transport plane. These bands 4.1-4.7 extend along the X-axis and lie adjacent to each other. As a result, each band's side connects to that of a neighboring band. Thus, a container that moves along the Y-direction would move from one band to the next. When it does so, it begins to move along the X-direction at whatever speed that band is moving at. The seventh band 4.7 lies furthest from the container inlet 2.1. The first band 4.1 is adjacent to and forms part of the container inlet 2.1 and of the conveyor.

Each band 4.1-4.7 forms a closed loop that can be driven to endlessly rotate by drive units. The bands 4.1-4.7 are arranged in such a way that the upper horizontal surfaces of the closed loops collectively form the transport plane.

The first and second transport bands 4.1, 4.2 and part of the third transport band 4.3 together form that portion of the transport plane that lies within the deceleration segment 2.2. The deceleration segment 2.2 runs increasingly obliquely relative to the first transport direction A.

Another portion of the third transport band 4.3 together with the fourth, fifth, sixth, and seventh transport bands 4.4-4.7, forms that portion of the transport plane within the shaping segment 2.3.

The fourth, fifth, sixth, and seventh transport bands 4.4-4.7 form part of the discharge conveyor 3. These transport bands extend in the second transport direction B out through the container outlet 2.4.

As suggested above, the process of shaping the narrow container stream into a wide container stream includes causing certain bands to move at different speeds.

In the illustrated embodiments, the first, second, and third transport bands 4.1-4.3 are driven at the same conveying speed. However, the fourth, fifth, sixth, and seventh transport bands 4.4-4.7 are driven at different speeds.

In particular, the conveying speed v4 of the fourth transport band 4.4 is less than the conveying speed v of the first, second, and third transport bands 4.1, 4.2, 4.3 by a factor of i4. The conveying speed v5 of the fifth transport band 4.5 is smaller by a factor of i5 than the conveying speed v4 of the fourth transport band 4.4. The conveying speed v6 of the sixth transport band 4.6 is smaller by a factor of i6 than the conveying speed v5 of the fifth transport band 4.5. The conveying speed v7 of the seventh transport band 4.7 is smaller by a factor of i7 than the conveying speed v6 of the sixth transport band. In a particular embodiment, the factors i4, i5, i6, i7 are given in the following table:

| Transport band | Conveying speed | Factor or reduction ratio |
| --- | --- | --- |
| 4.4 | v4 = v · i4 | i4 = 0.7-0.9 |
| 4.5 | v5 = v4 · i5 | i5 = 0.7-0.9 |
| 4.6 | v6 = v5 · i6 | i6 = 0.8-0.95 |
| 4.7 | v7 = v6 · i7 | i7 = 0.6-0.8 |

In some embodiments, appropriate reduction gears couple the transport bands 4.4, 4.5, 4.6, 4.7 to a common drive to achieve the different conveying speeds v, v4, v5, v6, v7.

First and second lateral guides 5, 6 extend along the X-axis to guide the containers as they enter the delivery conveyor 1. The first and send lateral guides 5, 6 are offset from each other by a distance that defines the channel width.

The first lateral guide 5 merges into an inner guide 7 that bounds an inner side of the shaping region 2. The second lateral guide 6 merges into an outer guide 8 that bounds an outer side of the shaping region 2. The inner guide 7 and the outer guide 8 face each other and cooperate to guide containers 4 along and to laterally delimit the lateral boundaries of the shaping region 2.

At the discharge conveyor 3, a third lateral guide 9 connects to the inner guide 7 and a fourth lateral guide 10 connects to the outer guide 8. In the particular embodiment shown, the third lateral guide 8 is collinear with the X-axis and the fourth lateral guide 10 extends parallel to third lateral guide 9. A distance that separates the third and fourth lateral guides 9, 10 defines the width of the multi-lane container stream at the discharge conveyor 3. A suitable implementation for one or more of the container guides 5, 6, 7, 8, 9, 10 is a guide railing.

The inner and outer container guides 7, 8 run along directions that have components that are oblique to the X-axis. In the illustrated embodiments, a first connection line L1 extends between the start of the container guide 7 at the container inlet 2.1 and the end of the container guide 7 at the container outlet 2.4. A second connection line L2 extends between the start of the container guide 8 at the container inlet 2.1 and the end of the container guide 8 at the container outlet 2.4. The first connection line L1 and the X-axis form an angle α of between 25° and 30°. The second connection line L2 and the X-axis form an angle β of between 13° and 15° between them. In a preferred embodiment, the first connection line forms an angle of 30° with the X-axis and the second connection line L2 form an angle β of 15° with the X-axis. The first and second connection lines L1, L2 are imaginary lines that are not part of the apparatus. They are discussed herein only to explain the geometry. These angular ranges possess an unexpected criticality because they have been found to be particularly useful at promoting interruption-free stream widening.

The inner and outer guides 7 and 8 are not straight lines. Instead, they are cambered and/or slewed. In the embodiment represented in FIG. 1, the inner guide 7 has been cambered to be convex on its inner side, which faces away from the first connecting line L1 and which guides the containers 4. The outer guide 8 has been cambered into an S-shape on its inner side, which is the side that guides the containers 4.

At the container inlet 2.1, the inner guide 7 intersects the first connecting line L1. As one moves away from the container inlet 2.1, the inner guide 7 bows outward toward the outer guide 8. As a result, the separation between the inner guide 7 and the connecting line L1 increases. Eventually, this separation reaches a maximum and starts to decrease. The separation continues to do so until the first connecting line L1 and the inner guide 7 meet again at the container outlet 2.4.

Starting from the container inlet 2.1, the outer guide 8 is initially cambered outward so that it moves away from the inner guide 7, thus increasing the separation between the outer guide 8 and the second connecting line L2.

Eventually, as one moves away from the container inlet 2.1, the outer guide 8 turns around and begins to move towards the second connecting line L2, eventually crossing it and ending a first section of the outer guide 8.

As one continues along a second section of the outer guide 8, the separation between the second connecting line L2 and the outer guide 8 increases again but in the opposite direction. As a result, the outer guide's separation from the first connecting line L1 decreases.

As one proceeds further, the separation between the outer guide 8 and the second connecting line L2 decreases once again until the two meet at the container outlet 2.4.

As a result of the courses of the inner and outer container guides 7, 8, the width of the conveying segment continuously increases from that of a single-lane container stream to that a multi-lane container stream. In some embodiments, the width of a single-lane container stream is just enough to accommodate a container having a diameter of between eighty and ninety millimeters and the multi-lane container stream has a width of between 330 millimeters and 440 millimeters, which is enough to accommodate four such containers. In this embodiment, the width will have reached 135 millimeters in the deceleration segment 2.2.

An interaction between the courses traversed by the inner and outer container guides 7, 8 and the different conveying speeds of the conveying bands 4.1-4.7 results in a substantially problem-free transition between an initially narrow container stream and a container stream having a width that is approximately a multiple of containers' diameter. In the illustrated embodiment, the width of the container stream at the container outlet 2.4 is about four times that of the containers' diameter.

The courses shown for the inner and outer container guides 7, 8 is particularly useful for shaping. In terms of the coordinate system shown, the course of the inner container guide 7 is given by the polynomial:

$$y=10^{-7}x^3-8\cdot 10^{-4}x^2+0.1975x+k1$$

and the course of the outer container guide 8 is given by the polynomial:

$$y=3\cdot 10^{-10}x^4+1\cdot 10^{-8}x^3-9\cdot 10^{-4}x^2+0.2633x+k2$$

In the foregoing expressions, x is the distance from the Y-axis or from a reference plane that includes the Y-axis and that is perpendicular to the transport plane. Similarly, y is the distance from the X-axis or from a reference plane that includes the X-axis and that is perpendicular to the transport plane. The constants k1 and k2 are related to each other by the expression:

$$k2=k1+a1\cdot D,$$

where D is the containers' diameter and a1 and a2 are between 1.03 and 1.5. In some embodiments, $$k1=587.68 \text{ and } k2=675.42.$$

In the illustrated embodiment, the inner container guide 7 the container inlet 2.1 meet at (x, y) coordinates (90 units, 600 units) and the inner container guide 7 and the container outlet 2.3 meet at (x, y) coordinates (1140 units, 0 units). Similarly, the outer container guide 8 at the container inlet 2.1 meet at (x, y) coordinates (90 units, 700 units) and the outer container guide 8 at the container outlet 2.4 meet at (x, y) coordinates (1140 units, 380 units). In both cases, the unit is a unit of length. In a typical embodiment, each unit is between 0.8 millimeters and 1 millimeter.

The foregoing relationships possess an unexpected criticality because the promote substantially problem-free widening of a container stream.

FIG. 1 shows an inner guide 7 having an optional short section 7' that merges into the third lateral guide 9. The short section 7' is cambered so that it appears concave from the point of view of a container on the transport path. FIG. 1 shows a preferred course for the inner and outer guides 7, 8. However, embodiments include those in which the container guides deviate from the illustrated course by as much as ±5%. However, to promote interruption-free operation, it is important for the container guides 7, 8 courses, or projections thereof onto the transport plane, to lie within a permissible range 12 shown in FIG. 2, which is bounded by first and second limit curves 7.1, 8.1.

The first limit curve 7.1 is defined by:

$$y=-7\cdot 10^{-4}x^2-0.1582x+k3$$

The second limit curve 8.1 is defined by:

$$y=10^{-6}x^3-15\cdot 10^{-4}x^2+0.3439x+k4$$

In the foregoing expressions, x is the distance from the Y-axis or from a reference plane that includes the Y-axis and that is perpendicular to the transport plane. Similarly, y is the distance from the X-axis or from a reference plane that includes the X-axis and that is perpendicular to the transport plane. The constants k3 and k4 are constrained by the following expressions: k3=a2·k1 and k4=a3·k1, where a2 is between 1.02 and 1.04 and preferably equal to 1.033 and a3 is between 1.18 and 1.2, and preferably equal to 1.177.

In some embodiments, k3/k4=0.88. In other embodiments, k3=607 and k4=692.

The foregoing relationships possess an unexpected criticality because it has been found that inner and outer container guides 7, 8 that have been constrained by these relationships promote interruption-free shaping of the container stream when they traverse courses that are within the permissible range 12 lying between the first and second limit curves 7.1, 8.1.

An unexpected property of the first and second limit curves 7.1, 7.2 is their criticality. It has been found that the first and second limit curves 7.1, 7.2 define the bounds of courses that result in interruption-free shaping of a single-lane container stream into the multi-lane container stream, and in particular, to a multi-lane conveying stream whose width is at least four times that of the single-lane container stream It has also been found particularly useful for the inner surfaces of the inner guide be cambered to be convex in at least one section within the shaping region and for the inner surface of the outer container guide 8 be cambered so as to be concave.

In some embodiments, securing elements 11 along the respective courses provide a way to secure the inner and outer container guides 7, 8 so that they extend along their defined courses. In some of these embodiments, the inner and outer container guides 7, 8 are each formed from a single section that extends all the way from the container inlet 2.1 to the container outlet 2.4. In other embodiments, the inner and outer container guides 7, are each formed from individual guide elements, each of which extends between sequential securing elements 11. This results in a piecewise linear guide similar to a portion of a polygon's perimeter.

In a preferred embodiment, the inner and outer container guides 7, 8 are formed by a guide profile 13 such as that shown in FIG. 3. The guide profile 13 extends from the container inlet 2.1 to the container outlet 2.4. The guide profile 13 features a smooth inner side 14 for guiding containers 4 and outer side having incisions 15 that form grooves. This permits the guide 7, 8 to be easily cambered. It is particularly useful for the guide profile 13 to be made from a flexible material, such as a plastic.

In FIG. 1, the container outlet 2.4 of the shaping region 2 is offset to the right in relation to the transport direction A. However, other embodiments include a mirror-image of the device shown in FIG. 1.

The invention has been described heretofore by reference to an exemplary embodiment. It is understood that modifications and derivations are possible without thereby departing from the inventive concept underlying the invention.

Having described the invention and a preferred embodiment thereof, what is claimed as new and secured by Letters Patent is:

1. An apparatus for shaping a narrow container stream, into a wide container stream, said apparatus comprising a first container guide, a second container guide, a shaping region, wherein said shaping region that comprises a container inlet, a container outlet, a deceleration segment, a shaping segment, said deceleration segment following said container inlet along a transport direction, said shaping segment following said deceleration segment along said transport direction and forming said container outlet, which follows said shaping segment along said transport direction, endlessly circulating transport bands that connect laterally to each other and define a transport plane along which said containers are transported, and a delivery conveyor that delivers containers to said container inlet, wherein said first and second container guides extend between said container inlet and said container outlet, thereby delimiting opposite sides of said shaping region, wherein said first and second container guides, or projections thereof onto said transport plane, are constrained to be between first and second limit curves, wherein there exists a coordinate system having an x-axis that extends along said transport bands and a y-axis that is perpendicular to said x-axis, wherein said first limit curve follows a course defined by $$y=-7\cdot 10^{-4}x^2-0.1582x+k3,$$

wherein said second limit curve follows a course defined by $$y=10^{-6}x^3-15\cdot 10^{-4}x^2+0.3439x+k4$$

wherein x is a distance from said y-axis, y is a distance from said x-axis, and k3 and k4 are constants that satisfy k3/k4=0.88, and wherein said first and second container guides comprise inner surfaces that face said container, said inner surfaces being cambered about axes perpendicular to said transport plane.

2. The apparatus of claim 1, wherein k3=607 and k4=692.

3. The apparatus of claim 1, wherein both ends of said first container guide are on a first connection line, both ends of said second container guide are on a second connection line, and said first and second connection lines define corresponding first and second angles relative to said transport bands, said second angle being less than said first angle.

4. The apparatus of claim 3, wherein said first and second angles lie within corresponding first and second critical ranges, said first critical range being between twenty-five degrees and thirty degrees of arc and said second critical range being between thirteen degrees and fifteen degrees of arc.

5. The apparatus of claim 1, wherein said inner side of said first container guide is cambered to be convex.

6. The apparatus of claim 1, wherein said inner side of said first container guide is cambered to be convex along said deceleration segment's entire length.

7. The apparatus of claim 1, wherein there exists a point between said container inlet and said container outlet such that said inner side of said first container guide is cambered to be convex between said container inlet and said point and to be concave between said point and said container outlet.

8. The apparatus of claim 1, wherein said inner side of said second container guide comprises a first portion that is cambered to be concave and a second portion that is cambered to be convex along said deceleration segment.

9. The apparatus of claim 8, wherein said first portion is longer than said second portion.

10. The apparatus of claim 1, wherein said inner side of said second container guide is cambered to have an "S" shape.

11. The apparatus of claim 10, wherein there exists a point along said inner side of said second container guide such that said inner side is cambered to be concave between said point and said container inlet and convex between said point and said container outlet.

12. The apparatus of claim 1, wherein courses of said first and second container guides, or projections thereof onto said transport plane, are defined by $$y=10^{-7}x^3-8\cdot 10^{-4}x^2+0.1975x+k1$$

and $$y=3\cdot 10^{-7}x^4+10^{-8}x^3-9\cdot 10^{-4}x^2+0.2633x+k2$$

respectively, wherein k1 and k2 are constants defined by $$k2=k1+a1\cdot D,$$

wherein D is a container diameter and a1 is a factor between 1.03 and 1.5.

13. The apparatus of claim 12, wherein k1=587.68 and k2=675.42.

14. The apparatus of claim 1, wherein courses of said first and second container guides, or projections thereof onto said transport plane, deviate by no more than five percent from courses defined by $$y=10^{-7}x^3-8\cdot 10^{-4}x^2+0.1975x+k1$$

and $$y=3\cdot 10^{-7}x^4+10^{-8}x^3-9\cdot 10^{-4}x^2+0.2633x+k2$$

respectively, wherein k1 and k2 are constants defined by $$k2=k1+a1\cdot D,$$

wherein D is a container diameter and a1 is a factor between 1.03 and 1.5.

15. The apparatus of claim 1, wherein said transport bands comprise at least seven laterally adjacent transport bands, at least four of which form said shaping segment.

16. The apparatus of claim 1, wherein said transport bands comprise first and second transport bands, said first transport band being closer to said second container guide, wherein said second transport band has a conveying speed that is less than that of said first transport band.

17. The apparatus of claim 16, wherein said aid second transport band has a conveying speed that is less than that of said first transport band by a factor that lies between 0.7 and 0.95.

18. The apparatus of claim 1, wherein said transport bands comprise a first transport band that moves at a first conveying speed, said first transport band being closest to said second container inlet, a second transport band that is laterally adjacent to said first transport band and that moves at a second conveying speed that is slower than said first conveying speed by a factor that is between 0.7 and 0.9, a third transport band that is laterally adjacent to said second transport band and that moves at a third conveying speed that is slower than said second conveying speed by a factor that is between 0.8 and 0.95, and a fourth transport band that is laterally adjacent to said third transport band and that moves at a fourth conveying speed that is less than said third conveying speed by a factor between 0.6 and 0.8, said fourth transport band being furthest from said container inlet.

19. The apparatus of claim 1, wherein said first and second container guides comprise guide element, wherein said apparatus further comprises securing points that are arranged along the courses followed by said first and second container guides, wherein each of said guide elements extends continuously from said container inlet to said container outlet, and wherein said guide elements are secured to said securing points.

20. The apparatus of claim 1, wherein at least one of said first and second container guides comprises a guide profile having an outer side and an inner side, wherein said inner side, which guides said containers, is continuous, and wherein said outer side comprises incisions that define grooves.

* * * * *